P. RASMUSSEN.
PAN DUMPING APPARATUS FOR CAKE AND CRACKER CONVEYERS.
APPLICATION FILED JAN. 3, 1921.
1,415,392.
Patented May 9, 1922.
3 SHEETS—SHEET 1.
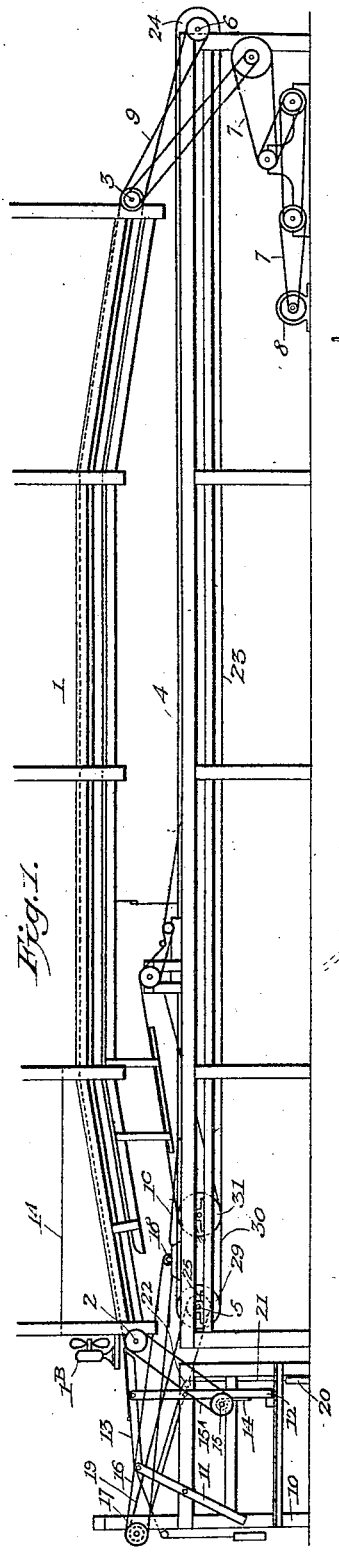
Inventor
By Peter Rasmussen.
H. S. Bailey  Attorney

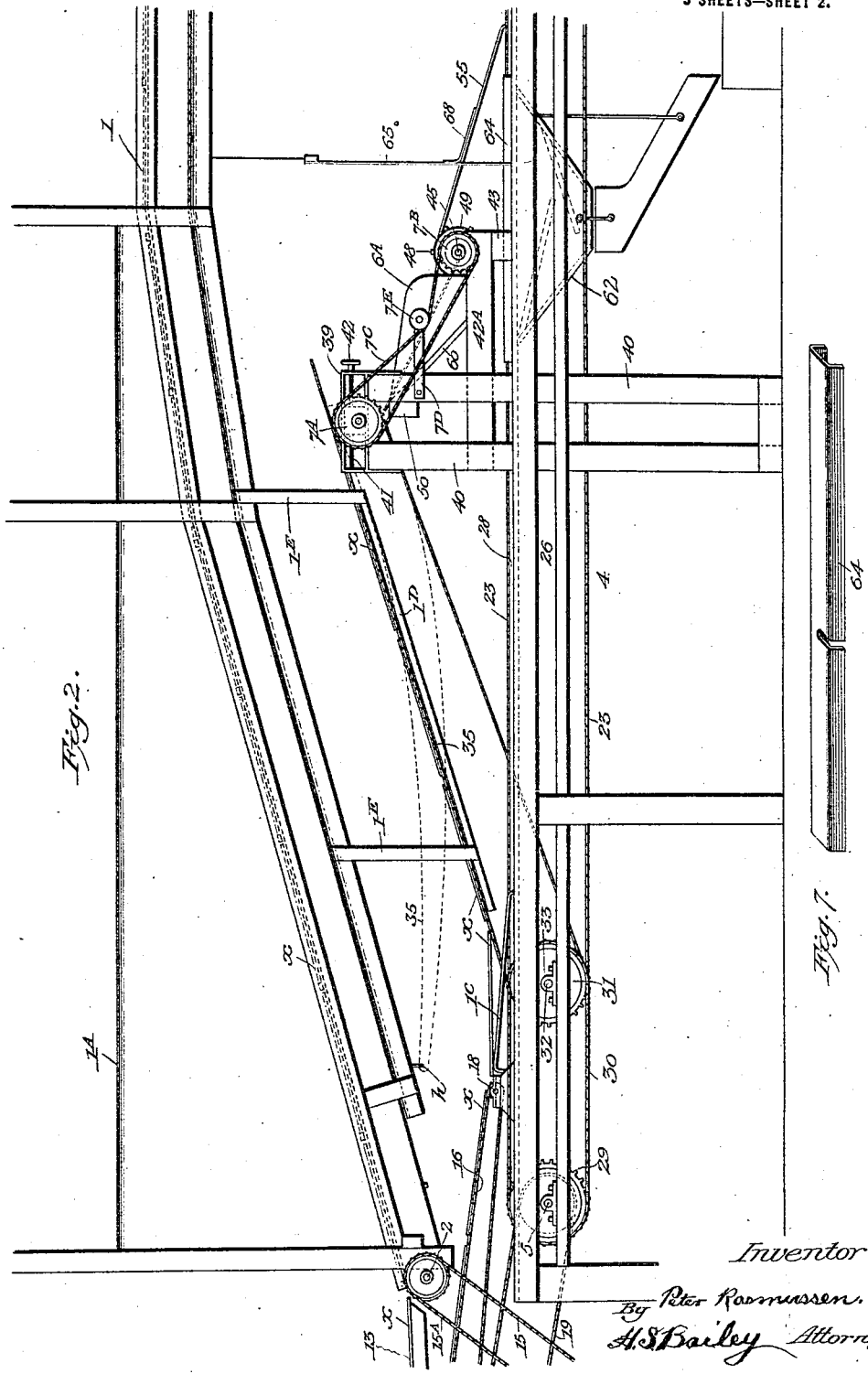

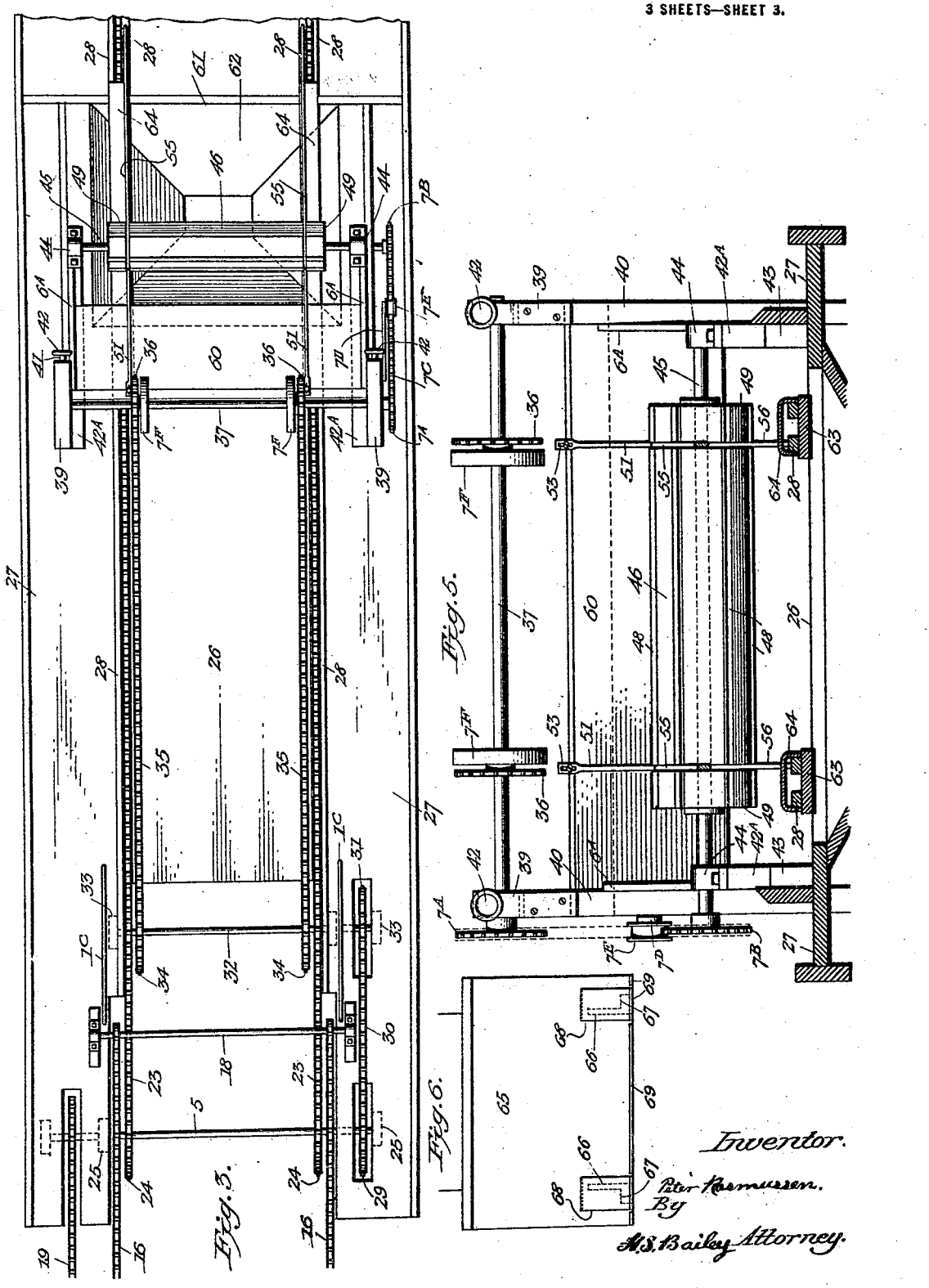

UNITED STATES PATENT OFFICE.

PETER RASMUSSEN, OF DENVER, COLORADO, ASSIGNOR OF ONE-HALF TO STEPHEN KNIGHT, OF DENVER, COLORADO.

PAN-DUMPING APPARATUS FOR CAKE AND CRACKER CONVEYERS.

1,415,392.                    Specification of Letters Patent.       Patented May 9, 1922.

Application filed January 3, 1921. Serial No. 434,554.

*To all whom it may concern:*

Be it known that I, PETER RASMUSSEN, a citizen of the United States of America, residing at the city and county of Denver and State of Colorado, have invented a new and useful Pan-Dumping Apparatus for Cake and Cracker Conveyers, of which the following is a specification.

This invention relates to improvements in pan dumping apparatus for cake and cracker conveyers.

The objects of the invention are:

To provide a pan dumping apparatus which is adapted to be used, when necessary, in connection with pan conveyers, such as are employed in cracker factories, and which can be eliminated when not required, the use or non use of the said dumping apparatus in no way interfering with the operation of the said pan conveyer.

Further, to provide a pan dumping apparatus to be used in connection with certain classes of goods, and which is operated by and in conjunction with a pan conveyer, said apparatus being adapted to receive and dump the pans, and then transfer them to the said conveyer, which passes them on to a point where they are removed; the said dumping apparatus being so arranged that it can be disconnected from the said conveyer, when not required, thus permitting the conveyer to be used independently of the dumping apparatus.

These objects are accomplished by the mechanism illustrated in the accompanying drawings, in which:

Figure 1 is a diagrammatic side elevation, illustrating a pan cooling and a pan return conveyer, a transferring device for passing the pans from the cooling to the return conveyer, and the improved dumping mechanism which operates in connection with the return conveyer.

Fig. 2 is a side elevation, on a larger scale than Figure 1, showing more clearly the pan dumping mechanism, and portions of the cooling and of the return conveyers.

Fig. 3 is a plan view of Figure 2, the upper or cooling conveyer being omitted.

Fig. 4 is a longitudinal sectional view through the dumping mechanism and adjacent portion of the return conveyer frame, on a still further enlarged scale.

Fig. 5 is a transverse sectional view of Figure 4.

Fig. 6 is a front view of a curtain which prevents the dumped goods from being thrown beyond the receiving hopper. And Fig. 7 is a perspective view of one of the chain guards, which cover that part of the chain above the hopper.

The improved pan dumping mechanism is shown as operating in connection with a pan cooling conveyer, a pan return conveyer and a cooperating transferring mechanism for passing the pans from the cooling conveyer to the return conveyer,—the said cooling and return conveyers and the cooperating transferring mechanism forming the subject matter of a pending application entitled, "Mechanism for transferring pans or other objects from one conveyer to an oppositely moving conveyer", filed by me on the 30th day of August, 1920, Serial Number 406,927.

In the present instance, pans of cakes, as they are taken from the oven, are placed on the cooling conveyer, which is of such a length that in traveling from its receiving end to its opposite end the cakes are cooled sufficiently to permit of handling; the pans are then transferred to an upwardly inclined conveyer which forms a part of the dumping mechanism, and which travels in the same direction as the return conveyer, the pans being dumped as they pass over the highest point or terminal of the said dumping conveyer, after which they pass on to the return conveyer, which extends to a point adjacent to the bake oven, where the pans are removed, greased, supplied with fresh dough, and placed again in the oven.

The dumping mechanism is used only in connection with such goods as are packed in bulk or "loose filled", and also for such goods as are to be iced, and when other goods, such as those which are collected in stack or column form, are handled, the dumping mechanism is put out of commission, in a manner to be hereinafter described, thus permitting pans to be passed directly to the return conveyer.

The present invention comprises a conveyer, the dumping mechanism which is mounted on the frame of the said conveyer and operated by said conveyer, and means for supplying pans to the dumping mechanism, as will now be described.

Referring to the accompanying drawings, the numeral 1 indicates an endless conveyer which, in practice, extends a suitable distance from a point adjacent a bake oven, and is supported at its ends upon shafts 2 and 3, the end portions of the conveyer being downwardly inclined. This conveyer comprises a cooling conveyer, and is adapted to receive the pans of cakes directly from the oven. An endless conveyer 4 is positioned a suitable distance beneath the conveyer 1 and is supported at opposite terminals on shafts 5 and 6. The shaft 3 of the conveyer 1 is connected by a system of belting 7 with a motor 8 and the said shaft 3 is also connected by a cross belt 9 with the shaft 6 of the conveyer 4, thus causing the conveyer 4 to travel in an opposite direction to the conveyer 1. The conveyer 4 operates the improved pan dumping mechanism, which is mounted on the frame of the said conveyer, and the conveyer will be more fully described hereinafter.

The transferring mechanism by which the pans X are transferred from the cooling conveyer to the return conveyer, or more strictly speaking, to the dumping mechanism, which acts in conjunction with the return conveyer, is fully shown and described in the pending application above referred to, and a detail description of the same is deemed unnecessary. The transferring mechanism is located at the ends of the conveyers 1 and 4 farthest from the oven, and comprises a frame 10 upon each side of which are pivotally mounted upright arms 11 and 12,— the upper ends of each pair of arms being connected by pan receiving arms 13 which extend forward in position to receive the pans from the conveyer 1.

The arms 12 are rocked by a cam 14 on a shaft 15 which is driven by a sprocket chain 15ᴬ from the conveyer shaft 2. As the arms 13 with the pans thereon, swing rearward, or away from the end of the conveyer 1, the pans thereon are deposited upon a pair of chains 16 on opposite sides of the frame 10 which are mounted at one terminal on sprocket wheels on a shaft 17 on said frame 10, and at the other terminal, on sprocket wheels on a shaft 18 which is mounted on the frame of the conveyer 4, and slightly above the said conveyer. The chains 16 are driven from the shaft 5 of the conveyer 4, by a chain 19 which passes around sprocket wheels on the said shaft 5 and the shaft 17 of the frame 10, thus causing the chains 16 to travel in the same direction as the conveyer 4, whereby the pans carried by the chains 16, are delivered either to the conveyer 4, or to the dumping conveyer, as the case may be. The pan receiving arms 13, after depositing the pans upon the chains 16, are returned to their pan receiving position again by a weight 20 on the end of a cord or cable 21 which passes over a pulley 22, and is connected at its opposite end with the upright arms 11.

The conveyer 4, which forms a cooperating part of the dumping mechanism, comprises parallel sprocket chains 23, which are mounted on pairs of sprocket wheels 24 on the shafts 5 and 6, which are supported in bearings 25 at opposite ends of a frame 26. The frame 26 includes side tables 27, which extend parallel with the conveyer, and as the horizontal portion of the cooling conveyer 1 is about six feet above the floor, it is out of the way of attendants stationed along the said tables. The platform of the frame 26, on the part of the frame between the tables 27 is provided with parallel chain guides 28 in the form of strips of wood between which the upper laps of the chains 23 move, but the chains project slightly beyond the upper surfaces of these guides, in order to receive and carry forward the pans.

The improved dumping mechanism which cooperates with and is operated by the conveyer 4 is arranged and constructed as follows:

Upon one end of the shaft 5 of the conveyer 4 is secured a sprocket wheel 29 which is connected by a chain 30 with a sprocket wheel 31 on a shaft 32 which is mounted in bearings 33 on the said frame 26. Upon the shaft 32 are also secured sprocket wheels 34 which are positioned inside but close to the chains 23, comprising the conveyer 4, and these sprocket wheels 34 are connected by chains 35 with sprocket wheels 36 on a shaft 37 which is mounted in adjustable bearings 38 which are supported in guideways 39, each of which is mounted upon the upper ends of a pair of parallel upright standards 40 which rest upon the floor, and extend up through the table portions of the frame and about eighteen inches above the said table.

As the shaft 32 is below the level of the table, and the shaft 37 is approximately ten feet from the shaft 32, and about eighteen inches above the level of the table, the chains 35 therefore, extend at an upward inclination from the sprocket wheels 34 to the sprocket wheels 36.

The bearings 38 for the shaft 37 are in the form of rectangular metal blocks having bearing holes to receive the ends of the said shaft, and they are also provided with threaded apertures at right angles to the bearing holes, through which are screwed threaded rods 41 which extend through holes at the forward ends of the guideways and are provided with hand wheels 42 having hubs which bear against the adjacent ends of the said guideways. By turning the rods 41, the bearing blocks 38 can be adjusted to give the desired tension to the chains 35.

A horizontal supporting strip 42ᴬ is bolted at one end portion to the inner faces of each pair of standards 40 and a short distance above the level of the table.

These strips extend about eighteen inches beyond the standards, and their free ends are supported upon blocks 43 which rest on the table. Upon the free ends of these strips are bolted bearings 44 in which is mounted a shaft 45 upon which is rigidly mounted a solid wood roller 46 which is covered with one or more thicknesses of canvas 47, and upon the canvas covering are nailed a plurality of equidistant, longitudinally disposed leather strips 48, the securing nails being driven into the wood roller, thereby rigidly securing the leather strips, as well as the canvas, to the roller. The leather strips are preferably about a half an inch square in cross section. Upon the shaft 45, and spaced a slight distance from the ends of the wood roller 46 are also secured short wood rollers 49 of the same diameter as the roller 46 and provided with the similar canvas coverings, and with similar leather strips, as the said roller 46, the combined widths of the roller 46 and of the short rollers 49, being equal, approximately, to the length of the baking pans employed.

The shaft 37 is provided at one end with a sprocket wheel 7$^A$, and the shaft 45 is provided on the corresponding end with a sprocket wheel 7$^B$, and these wheels are connected by a chain 7$^C$ by which means the shaft 45 and its rollers 46 and 49, are turned in the same direction as the shaft 37. A belt tightener is used in connection with the chain 7$^C$, and this tightener comprises an arm 7$^D$ which is pivotally attached at one end to the adjacent upright or standard 40, its opposite end being provided with a relatively heavy grooved roller 7$^E$ which rests upon the upper lap of the chain and keeps the same under tension, but permits adjustment of the bearing blocks 38 which support the shaft 37.

In order to prevent the pans X from being engaged by the sprocket wheels 36, as they are carried up by the chains 35, and over the said sprocket wheels, I secure upon the shaft 37, and adjacent to the inner side of each sprocket wheel 36, a disk 7$^F$ which is of slightly greater diameter than that of the sprocket wheel, and as the pans reach the highest points of the chains 35, they pass on to the disks 7$^F$, and are moved forward until their center of gravity is on the farther side of the shaft 37, when they are automatically dumped, as will be more fully explained hereinafter.

A cross bar 50 connects two of the uprights 40, and is positioned a short distance below the sprocket wheels 36. A pair of rods 51 are secured at their upper ends to the upper edge of the cross bar 50, and their lower end portions extend between the opposing ends of the main roller 46 and the short rollers 49 and beneath the shaft 45, and these lower end portions of the rods are bent into eyes 52 which surround the shaft 45, as clearly shown in Figure 4. The upper end portions of the rods 51 are flattened, and slotted, as shown at 53 in Figure 5, and the securing screws for the rods pass through these slots, thus accommodating any variation in the distance between the shaft 45 and the cross bar 50. The rods 51 constitute bumper rods for the pans, as will be hereinafter explained. The upper curved ends 54 of a pair of slide rods 55, also lie between the opposing ends of the long roller 46 and the short rollers 49 and these rods are provided, near these curved ends, with depending legs 56, the lower end portions of which are threaded, and extend loosely into holes in the two inner chain guides 28. Nuts 57 are screwed upon the threaded ends of these legs, and rest upon the chain guide, and by adjusting these nuts the curved ends of the rods 55 are supported at the required height above the table, as will be understood by reference to Figure 4. The rods 55 incline downwardly from their curved ends, and their lower ends are bent to vertical positions and are inserted in holes in the chain guide 28. The curved ends 54 of these rods fill the space between the ends of the roller 56 and the rollers 59, and this prevents cakes from entering the said spaces.

An inclined board 60 extends downward from the cross bar 50, its lower edge resting on the supports 42$^A$, a short distance from the roller 46, and upright side boards 6$^A$ are positioned at each end of the board 60. A rectangular opening 61 is formed in the table 26, below the roller 46, the opening being of slightly greater length than the rollers 46 and 49, its width being approximately the same as its length. A hopper 62 is secured around the four sides of this opening, and this hopper may be arranged to discharge directly into a conveyor if desired, but in the drawings I have shown a chute suspended below the outlet of the hopper, which leads to a box or other receptacle, which can be removed when filled, and replaced with another box. Chain supports 63 bridge the opening 61 in the table, and the conveyer chains 23 ride on these supports and are thus prevented from sagging, while chain guides 28 which also extend across these supports, keep the chains from lateral movement. Removable housings 64 are placed over the bridges 63, to prevent the cakes, as they are dumped into the hopper, from lodging on the chains and being carried forward thereby. A curtain 65 is suspended from the frame of the upper conveyer, and hangs a short distance in front of the roller 46. This curtain is made of canvas or other suitable material and is about the width of the opening 61 in the table. This curtain is provided with slits 66 to accommodate the rods 55, and these slits are widened at their lower ends as shown at 67, to accommodate the chain housings 64. Flaps 68 are secured at their upper ends to the curtain, so as to cover the slits 66, and their enlarged lower ends 67 and the lower ends of the flaps, as well as the lower end of the curtain, are weighted, preferably by securing sections of rods 69 to them, as shown in Figure 6. When the curtain is in a vertical position, the rods 55 extend through the slits 66 and the flaps 68 rest upon the rods. As the dumped pans slide down on the rods 55, they engage the curtain and swing it back, so that the pan slides under the curtain. The curtain prevents goods passing beyond the hopper opening, and the flaps 68 prevent goods passing through the slits in the bottom edge of the curtain.

In operation, the pans of cakes are taken from the oven, and placed on the cooling conveyer 1, which is of sufficient length to permit the cakes to cool by the time they reach the discharge end of the said conveyer; and to insure the required degree of cooling, a hood or inclosure $1^A$ is placed at the discharge end of the conveyer, at the outer end of which an electric fan $1^B$ is installed, which directs a draft of cool air against the approaching pans of cakes. The pans are received by the arms 13 which are swung back by engagement of the cams 14 with the arms 12 and the pans are thereby deposited upon the parallel chains 16, by which they are carried forward in the opposite direction, to and above the receiving end of the conveyer 4, and as these goods are to be packed in bulk, or "loose filled", they are not deposited upon the said conveyer 4, but upon the upwardly inclined conveyer chains 35 of the dumping mechanism. The pans, however, do not pass directly from the chains 16 to the chains 35, but after passing the terminal of the chains 16, they are caught by downwardly inclined slidebars $1^C$, which extend parallel with the chain 35, and these slidebars pass the pans on to the chains 35, which are prevented from sagging by boards or supports $1^D$ which are supported by depending strips $1^E$ which are secured at their upper ends to the frame of the conveyer 1. As the pans reach the apex or highest point of the chains 35, they pass onto, and ride over the disks $7^F$, and are tilted by gravity as the preponderance of their weight passes beyond the axis of the shaft 37, and they swing downward, their forward edges striking the rods 51 with sufficient force to jar the cakes or other goods loose from the pan, the goods falling through the opening 61 and into the hopper; the inclined board 60 prevents the goods from lodging on the table back of the hopper opening, while the curtain prevents the cakes from being thrown forward beyond the hopper opening. The pans first strike the rods 51 at a point some distance above the roller 46 and then slide on the rods until they engage the roller, and this further jar or bump tends to dislodge any goods from the pan, that they may not have been affected by the first bump. At this stage the lower end of each pan rests on the bars 51 and against the roller 46, while its upper end lies against the disks $7^F$, as clearly shown by Figure 4, but this position is only momentary, as the said lower edge of the pan is almost instantly caught by one of the leather strips 48 on the rollers 46 and 49, and the pan is lifted slightly and its lower edge is carried forward over the rollers and on to the slide rods 55. When the upper end of the pan slides off the disks $7^F$, it strikes the rods 51, thus imparting a third bump or jar to the pan, and after passing over the rollers, the pan slides down the rods 55 and is caught and carried forward by the chains 23, until they arrive at the terminal or oven end of the conveyer, where the pans are removed, greased, replenished with dough, and placed again in the oven. When the dumping mechanism is not required, the chains 35 are disconnected from the sprocket wheels 34 on the shaft 32, and suspended from a hook $h$ in the frame of the upper conveyer 1, as shown by dotted lines in Figure 2; the chain guards or housings 64 are removed, as well as the rods 55, thus leaving the conveyer chains 23 free to be used in connection with goods other than those that are passed over the dumping mechanism.

The long roller 46 may be dispensed with, if desired, and only the two short rollers 49 employed, and the hopper 62 may be provided with one or more baffles or deflectors $62^A$, which prevent the dumped goods from dropping directly through the hopper by deflecting them to one side, so that their fall is broken, and they pass through the hopper with less liability of breakage.

Having described my invention, what I claim as new and desire to secure by Letters Patent, is:

1. In a pan dumping mechanism for pan conveyers, the combination with oppositely moving conveyers arranged one above the other, and a transferring mechanism for transferring the pans from the upper to the lower conveyer, of a pan dumping conveyer mechanism connected to and movable with said lower conveyer, and means for releasing the pans at a predetermined point, downwardly inclined members on which said pans run when released from said conveyer, a roller at the lower end of said members against which said pans strike, means on said roller for raising said pans up over it and for moving them onto the lower conveyer, whereby they are conveyed to a reloading point.

2. In a pan dumping mechanism for pan conveyers, the combination with oppositely moving conveyers arranged one above the other, and a transferring mechanism for transferring the pans from the upper to the lower conveyer, of a pan dumping conveyer mechanism connected to and movable with said lower conveyer, and means for releasing the pans at a predetermined point, downwardly inclined members on which said pans run when released from said conveyer, a roller at the lower end of said members against which said pans strike, means on said roller for raising said pans up and over it and for moving them onto the lower conveyer, whereby they are conveyed to a reloading point, said pan dumping members being lengthwise adjustable and arranged to allow the pans to strike the roller in line with or just below the center of the roller.

3. In a pan dumping mechanism for pan conveyers, the combination with oppositely moving conveyers arranged one above the other, and a transferring mechanism for transferring the pans from the upper to the lower conveyer, of a pan dumping conveyer mechanism connected to and movable with said lower conveyer, and means for releasing the pans at a predetermined point, donwardly inclined members on which said pans run when released from said conveyer, a roller at the lower end of said members against which said pans strike, means on said roller for raising said pans up over it and for moving them onto the lower conveyer, whereby they are conveyed to a reloading point, said pan dumping members being lengthwise adjustable and arranged to allow the pans to strike the roller in line with or just below the center of the roller, said roller's pan lifting means comprising projections on the peripheral surface of said roller arranged parallel to its longitudinal axis.

4. In a pan dumping mechanism of the character described, the combination with an endless conveyer, of an inclined endless conveyer, which rises from the level of the first conveyer and moves in the same direction, means for feeding pans to the inclined conveyer, whereby they are carried over the highest point of said inclined conveyer and tilted by gravity, means for receiving the impact of the tilted pan, and means for receiving and for passing the pan to the first conveyer.

5. In a pan dumping mechanism of the character described, the combination with a main endless conveyer, of an inclined endless conveyer above the main conveyer, which rises from the level of the main conveyer, and moves in the same direction, means for delivering pans to the inclined conveyer, whereby they are carried over the highest point of said conveyer and tilted by gravity, downwardly inclined members for receiving the impact of the forward end of the tilted pan, means for momentarily arresting the sliding movement of the pan on the inclined members, and then imparting a forward movement to the same, and means for passing the pan on to the main conveyer.

6. In a pan dumping mechanism of the character described, the combination with a main endless conveyer, of an inclined endless conveyer above the main conveyer and operated thereby, which rises from the level of the main conveyer and travels in the same direction, means for delivering pans to the inclined conveyer, whereby they are carried over the highest point of said conveyer and are tilted by gravity, downwardly inclined members for receiving the impact of the forward end of the tilted pan, rotating means operated by the inclined conveyer for momentarily arresting the sliding movement of the pan on the inclined members and then imparting a forward movement to the same, and slides for passing the pan to the main conveyer.

7. In a pan dumping apparatus of the character described, the combination with a main conveyer comprising parallel endless chains, of an inclined endless conveyer comprising parallel endless chains which lie between and rise from the level of and move in the same direction as the main conveyer chains, means for delivering pans to the inclined conveyer, whereby they are moved up and over the highest point of said conveyer and are tilted by gravity, downwardly inclined rods for receiving the impact of the forward end of the tilted pan, rotary means operated by the inclined conveyer for momentarily arresting the sliding movement of the pan on the inclined rods and then moving it forward again, and slide rods which incline downward from said rotary means, which receive said pan and pass it to the main conveyer.

8. In a pan dumping mechanism of the character described, the combination with a main endless conveyer, of a relatively short inclined endless conveyer above the main conveyer and moving in the same direction, means for delivering pans to the inclined conveyer, whereby they are carried up and over the highest point of the inclined conveyer and are dumped by gravity, a roller, downwardly inclined rods which extend from the dumping point of the pans to said roller to receive the impact of the forward ends of the pans, said roller acting to momentarily stop the sliding movement of the pans on the said rods, projections on the roller for engaging the pans and moving them forward again, and downwardly inclined rods extending from said roller for passing said pans to said main conveyer.

9. In a pan dumping mechanism of the character described, the combination with endless conveying and dumping means, of inclined abutments for receiving the impact of the forward end of a dumped pan, and permitting a sliding movement of said pan, a roller for momentarily stopping said pan, and then starting it forward again, an endless conveyer, and means extending from the roller for passing the pan to said conveyer.

10. In a pan dumping mechanism of the character described, the combination with a table and an endless main conveyer mounted thereon, of a relatively short inclined endless conveyer above the main conveyer and travelling in the same direction, said inclined conveyer ascending from the plane of the main conveyer, near one end thereof, endless means for delivering pans to said inclined conveyer, whereby said pans are carried up and over the highest point of said conveyer and are dumped by gravity, a shaft having a roller thereon, rods which extend from a point below the highest point of said inclined conveyer down to and are secured upon the shaft of said roller, said rods being adapted to receive the impact of the forward ends of said pans as they dump by gravity and permit them to slide against said roller, longitudinal strips on said roller for engaging the edges of the pans and moving them forward, and slide rods extending downward from said roller to the plane of the main conveyer, for passing said pans to said main conveyer.

11. In a pan dumping apparatus of the character described, the combination with a main conveyer, cooperating pan dumping means operated by said main conveyer and endless means for delivering pans to the dumping means, of a roller having a suitable fabric covering, longitudinal, equidistant strips on said roller, downwardly inclined rods extending from the dumping point of said pans to said roller, and adapted to receive the impact of the forward ends of said dumped pans, and permit them to slide against said roller, said pans being engaged by said roller, and moved forward, and downwardly inclined slides leading from said roller for passing said pans to said main conveyer.

12. In a pan dumping apparatus of the character described, a table, a main endless chain conveyer mounted in said table, supports extending above said table, a shaft mounted on said supports having sprocket wheels thereon and disks of slightly greater diameter than said sprocket wheels, a shaft mounted in said table having sprocket wheels thereon and operated by said main conveyer, chains connecting the sprocket wheels on said shafts, said chains lying within the main conveyer chains and inclining upward from the table, means for delivering pans to the inclined chains, whereby they are carried up over said disks and are dumped by gravity, means for receiving the impact of the forward end of the pans, and means for passing the pans to the main conveyer.

13. In a pan dumping apparatus of the character described, the combination with a table, a support thereon and an inclined pan dumping conveyer mounted at its higher end on said support, of a shaft, a main roller thereon, and short rollers separated from the main roller by a slight space, downwardly inclined bumper rods secured at their upper ends to said support, their opposite end portions extending between the opposite ends of the long and short rollers, and being bent around said shaft, downwardly inclined slide rods extending from said roller, having curved ends which lie between the opposing ends of said long and short rollers, legs extending from said curved ends having threaded lower end portions which enter apertures in said table, and nuts on said threaded portions which rest on said table, and endless conveyer chains in said table in line with said slide rods, said bumper rods being adapted to receive the impact of the pans dumped by said conveyer, and to slide said pans against said roller, and strips on said roller for engaging said pans and passing them on to said inclined slide rods, whereby the pans are passed to said conveyer chains.

In testimony whereof I affix my signature in presence of two witnesses.

PETER RASMUSSEN.

Witnesses:
G. SARGENT ELLIOTT,
ELIZABETH SMITH.